United States Patent
Jang et al.

(10) Patent No.: US 12,438,545 B2
(45) Date of Patent: Oct. 7, 2025

(54) LEVEL SHIFTER AND DISPLAY DEVICE INCLUDING THE SAME

(71) Applicant: LG DISPLAY CO., LTD., Seoul (KR)

(72) Inventors: Hoon Jang, Paju-si (KR); Jun O Hur, Paju-si (KR); Dong Ju Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/455,718

(22) Filed: Aug. 25, 2023

(65) Prior Publication Data

US 2024/0204781 A1   Jun. 20, 2024

(30) Foreign Application Priority Data

Dec. 14, 2022   (KR) .......................... 10-2022-0174463

(51) Int. Cl.
  *G09G 5/00*    (2006.01)
  *G09G 3/3233*  (2016.01)
  *H03K 19/0185* (2006.01)
  *G11C 19/28*   (2006.01)

(52) U.S. Cl.
  CPC ..... *H03K 19/01855* (2013.01); *G09G 3/3233* (2013.01); *G09G 2300/0842* (2013.01); *G09G 2310/0289* (2013.01); *G09G 2310/08* (2013.01); *G09G 2330/06* (2013.01); *G11C 19/28* (2013.01)

(58) Field of Classification Search
  None
  See application file for complete search history.

(56) References Cited

U.S. PATENT DOCUMENTS

| | | | |
|---|---|---|---|
| 2011/0157132 A1* | 6/2011 | Byun | G09G 3/3677 345/211 |
| 2013/0082996 A1 | 4/2013 | Kim et al. | |
| 2022/0208052 A1 | 6/2022 | Jang et al. | |

FOREIGN PATENT DOCUMENTS

| | | |
|---|---|---|
| CN | 103956148 A | 7/2014 |
| KR | 10-2011-0077211 A | 7/2011 |
| KR | 10-2017-0015728 A | 2/2017 |
| KR | 10-2019-0037749 A | 4/2019 |

OTHER PUBLICATIONS

Japanese Office Action dated Nov. 14, 2024 issued in Patent Application No. 2023-183654 w/English Translation (6 pages).

* cited by examiner

*Primary Examiner* — Carl Adams
(74) *Attorney, Agent, or Firm* — Fish & Richardson P.C.

(57) ABSTRACT

A level shifter includes a first power input terminal to which a first gate voltage may be applied; a second power input terminal to which a second gate voltage may be applied; a third power input terminal to which a third gate voltage may be applied; an output terminal; a first switch element configured to electrically connect the first power input terminal to the output terminal in response to a voltage of on-intervals of a first control signal; a second switch element configured to electrically connect the second power input terminal to the output terminal in response to a voltage of on-intervals of a second control signal; and a third switch element configured to electrically connect the third power input terminal to the output terminal in response to a voltage of on-intervals of a third control signal.

9 Claims, 13 Drawing Sheets

LEVEL SHIFTER AND DISPLAY DEVICE INCLUDING THE SAME

CROSS-REFERENCE TO RELATED APPLICATION

This application claims the priority of Korean Patent Application No. 10-2022-0174463, filed Dec. 14, 2023, which is hereby incorporated by reference in its entirety.

BACKGROUND

Field of the Disclosure

The present disclosure relates to a level shifter and a display device including the same.

Description of the Background

A driving circuit of a flat panel display (FPD) reproduces an input image on a pixel array by writing pixel data of an input image into pixels of a display panel. The driving circuit of such a display device includes a data driving circuit for supplying data signals to data lines, a gate driving circuit for supplying gate pulses to gate lines, a timing controller for controlling operation timings of the data driving circuit and the gate driving circuit, and the like.

The timing controller may control outputs of the data driving circuit and the gate driving circuit. The timing controller generates a clock signal to control the gate driving circuit. A level shifter outputs a shift clock for driving the gate driving circuit in response to a clock inputted from the timing controller. The gate driving circuit sequentially outputs gate pulses using a shift register to which the shift clock from the level shifter is inputted.

Various studies are being conducted to reduce an electromagnetic interference (EMI) of a display device. In the case of a level shifter, to add an EMI filter to an output stage of the level shifter or adjust an on-resistance of a buffer transistor of the output stage of the level shifter, a method of connecting a plurality of transistors in parallel is being considered. However, in this method, power consumption occurs in the EMI filter added to the output stage of the level shifter, and the size and cost of a chip of an integrated circuit (IC) in which the level shifter is embedded may be increased. If there is a dead time between the on/off timings of switch elements constituting the level shifter, an EMI reduction effect is limited due to harmonics and peak currents generated when voltages of control signals is rapidly changed after the dead time.

SUMMARY

Accordingly, the present disclosure is directed to a level shifter and a display device including the same that substantially obviate one or more of problems due to limitations and disadvantages described above.

More specifically, the present disclosure is to provide a level shifter capable of reducing EMI of the level shifter and a display device including the same.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

The present disclosure is not limited to the above-described and other features of the present disclosure will be apparent to those skilled in the art from the following descriptions.

To achieve these and other advantages and in accordance with the present disclosure, as embodied and broadly described, a level shifter includes a first power input terminal to which a first gate voltage may be applied; a second power input terminal to which a second gate voltage lower than the first gate voltage may be applied; a third power input terminal to which a third gate voltage lower than the first gate voltage and higher than the second gate voltage may be applied; an output terminal through which a shift clock may be outputted; a first switch element configured to electrically connect the first power input terminal to the output terminal in response to a voltage of on-intervals of a first control signal; a second switch element configured to electrically connect the second power input terminal to the output terminal in response to a voltage of on-intervals of a second control signal; and a third switch element configured to electrically connect the third power input terminal to the output terminal in response to a voltage of on-intervals of a third control signal. A portion of a first on-interval of the third control signal may be overlapping with a portion of the on-intervals of the first control signal. A portion of a second on-interval of the third control signal may be overlapping with a portion of the on-intervals of the second control signal.

The first on-interval of the third control signal may include a first non-overlapping interval not overlapping with the on-interval of the first control signal and the on-interval of the second control signal; and a first overlapping interval overlapping with a portion of an interval including a rising edge of a pulse among the on-intervals of the first control signal. The second on-interval of the third control signal may include a second non-overlapping interval not overlapping with the on-interval of the first control signal and the on-interval of the second control signal; and a second overlapping interval overlapping with a portion of an interval including a rising edge of a pulse among the on-intervals of the second control signal.

During the first overlapping interval, a current may flow between the first power input terminal and the output terminal and simultaneously a current may flow between the third power input terminal and the output terminal. During the second overlapping interval, a current may flow between the second power input terminal and the output terminal and simultaneously a current may flow between the third power input terminal and the second power input terminal.

The level shifter may further include a control part configured to receive a first input clock and a second input clock which has the same frequency as the first input clock and a phase difference with respect to the first input clock, and configured to output the first control signal, the second control signal, and the third control signal.

The first overlapping interval and the second overlapping interval may not be overlapping with the first input clock and the second input clock, respectively.

During the first overlapping interval and the second overlapping interval, a current may flow in a power supply wire to which the third gate voltage is applied, and pulses of the first input clock and the second input clock may not be inputted in the level shifter.

The first non-overlapping interval and the second non-overlapping interval may not be overlapping with the on-interval of the first control signal and the on-interval of the second control signal, respectively.

The on-interval of the first control signal may include the first overlapping interval; and a third non-overlapping interval not overlapping with the on-interval of the second control signal and the first and second on-intervals of the third control signal. The on-interval of the second control signal may include the second overlapping interval; and a fourth non-overlapping interval not overlapping with the on-interval of the first control signal and the first and second on-intervals of the third control signal.

A display device according to one aspect of the present disclosure may include a display panel on which a plurality of data lines, a plurality of gate lines, and a plurality of pixels are disposed; the level shifter as described above; a data driver configured to output data signals applied to the data lines; a gate driver configured to receive a shift clock from the level shifter and supply gate pulses to the gate lines.

In another aspect of the present disclosure, a display device includes a display panel on which a plurality of data lines, a plurality of gate lines, and a plurality of pixels are disposed; a data driver configured to output data signals applied to the data lines; a gate driver configured to receive a shift clock and supply gate pulses to the gate lines; a power circuit configured to output a first gate voltage, a second gate voltage lower than the first gate voltage, and a third gate voltage having a voltage level between the first gate voltage and the second gate voltage; and a level shifter configured to receive a first input clock, a second input clock which has the same frequency as the first input clock and a different phase with respect to the first input clock, the first gate voltage, the second gate voltage, and the third gate voltage, and configured to output the shift clock. A current may flow in a power supply wiring to which the third gate voltage is applied among power supply wirings connected between the power circuit and the level shifter during at least a portion of time when there are no pulse of the first input clock and no pulse of the second input clock.

According to the present disclosure, an overlapping period in which gate voltages having different voltage levels are short-circuited at the rising edge and the falling edge of the shift clock inputted to the gate driver is set to lower the slew rate, thereby EMI characteristics may be improved.

According to the present disclosure, some of the control signals that control the switch elements for switching the gate voltages inputted to the level shifter are overlapping with each other to reduce the dead time that exists between pulses of the control signals, thereby reducing an EMI.

Effects which may be achieved by the present disclosure are not limited to the above-mentioned effects. That is, other features that are not mentioned may be obviously understood by those skilled in the art to which the present disclosure pertains from the following description.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
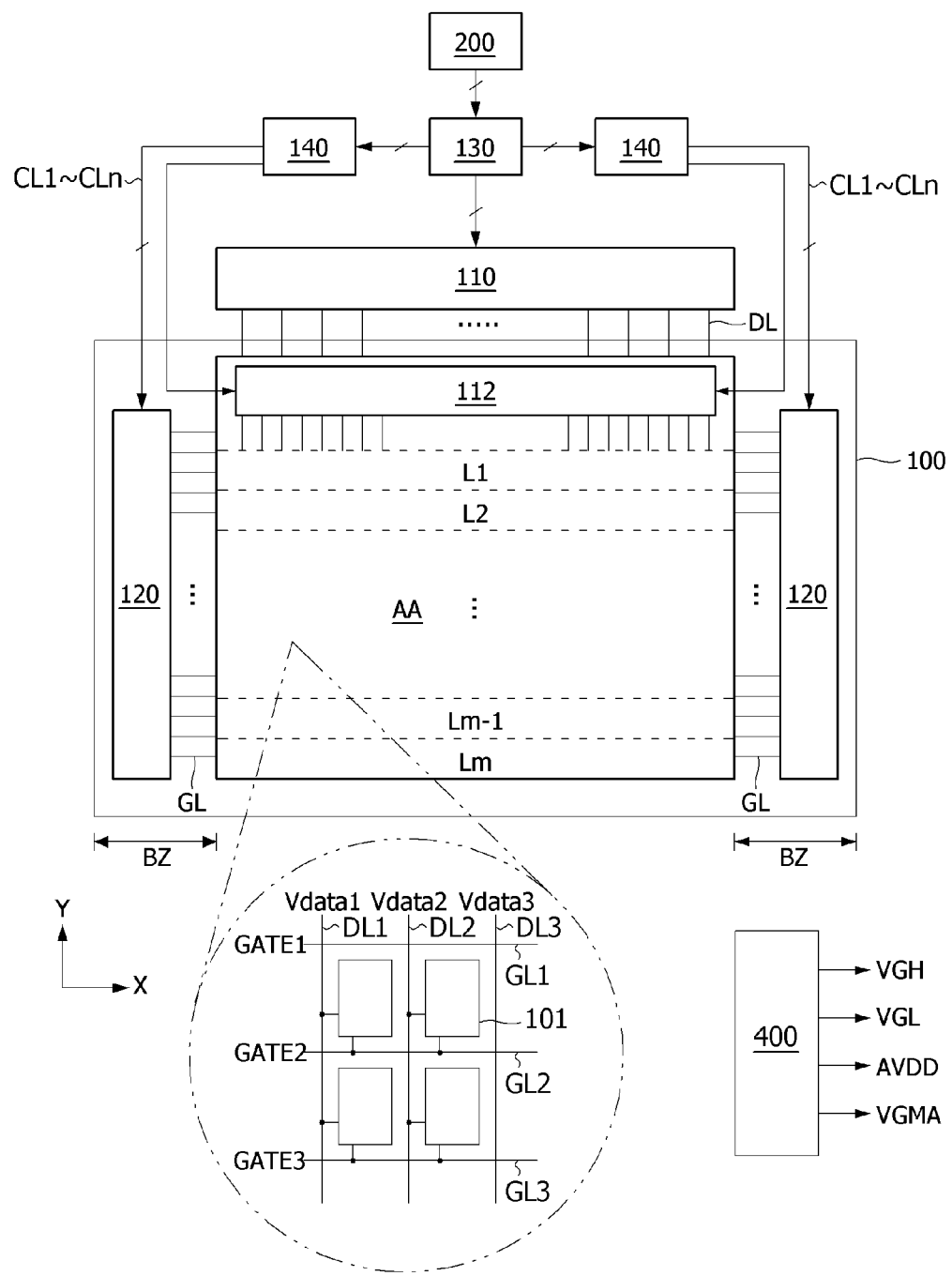
FIG. 1 is a block diagram showing a display device according to an aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The same reference numerals may refer to substantially the same elements throughout the present disclosure.

The following aspects may be partially or entirely bonded to or combined with each other and may be linked and operated in technically various ways. The aspects may be carried out independently of or in association with each other.

In a display device of the present disclosure, a display panel driving circuit, a pixel array, a level shifter, and the like may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

The present disclosure may be applied to any flat panel display device that requires an integrated circuit and a power circuit for driving pixels, such as a Liquid Crystal Display (LCD), an Organic Light Emitting Display (OLED Display) and the like.

Hereinafter, various aspects of the present disclosure will be described in detail with reference to the accompanying drawings.

Referring to FIGS. 1 to 3C, a display device according to an aspect of the present disclosure includes a display panel 100 and a display panel driving circuit.

The screen of the display panel 100 includes a pixel array AA displaying pixel data of an input image. The pixel data of the input image is displayed on pixels of the pixel array AA. The pixel array AA includes a plurality of data lines DL, a plurality of gate lines GL intersecting the data lines DL, and pixels arranged in a matrix form. The arrangement of pixels may be formed in various ways, such as a form sharing pixels emitting the same color, a stripe form, a diamond form, or the like, in addition to the matrix form.

When a resolution of the pixel array AA is n*m, the pixel array AA includes n pixel columns and m pixel lines L1 to Lm intersecting the pixel columns. The pixel line includes pixels arranged along a first direction X. The pixel column includes pixels arranged along the first direction. One horizontal period (1H) is a time obtained by dividing one frame period by the number of m pixel lines L1 to Lm. Pixel data is written to pixels of one pixel line in one horizontal period (1H).

Each of the pixels includes two or more sub-pixels 101 for color implementation. For example, each of the pixels may be divided into a red sub-pixel, a green sub-pixel, and a blue sub-pixel. Each of the pixels may further include a white sub-pixel. Each of the sub-pixels 101 includes a pixel circuit. The pixel circuit includes a pixel electrode, one or more thin film transistors (TFTs), and a capacitor. The pixel circuit is connected to the data line DL and the gate line GL. In the case of an organic light emitting display device, the pixel circuit may be implemented with the circuit shown in FIG. 2, but is not limited thereto.

Figure 2:
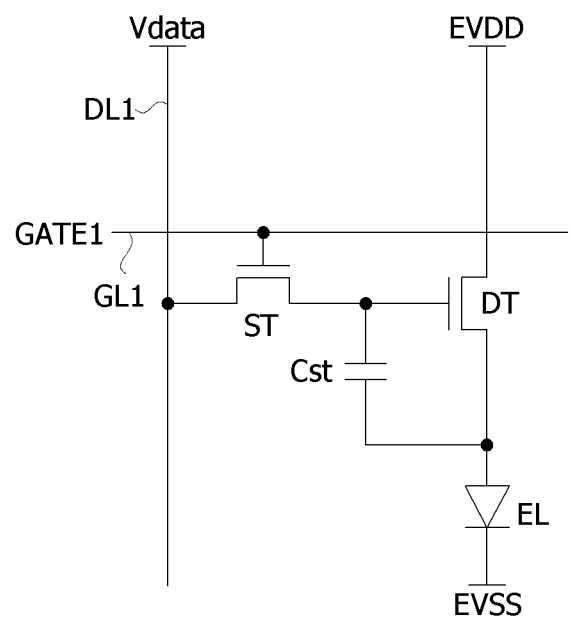
FIG. 2 is a circuit diagram showing an example of a pixel circuit.

Referring to FIG. 2, the pixel circuit includes a light emitting element EL, a driving element DT supplying current to the light emitting element EL, a switch element ST supplying a data signal Vdata to a gate electrode of the driving element DT in response to a gate pulse GATE, and a capacitor Cst connected between a gate electrode and a source electrode of the driving element DT. The driving element DT and the switch element ST may be implemented with n-channel transistors.

A pixel driving voltage EVDD may be applied to a drain electrode of the driving element DT. The driving element DT drives a light emitting element EL by supplying a current to the light emitting element EL depending on a gate-source voltage Vgs. The switch element DT is turned on in response to a gate high voltage VGH of the gate pulse GATE and turned off depending on a gate low voltage VGL. The light emitting element EL is turned on and emits light when a forward voltage between an anode electrode and a cathode electrode is greater than or equal to a threshold voltage. A pixel base voltage EVSS lower than the pixel driving voltage EVDD is applied to the cathode electrode of the light emitting element EL. The capacitor Cst is connected between the gate electrode and the source electrode of the driving element DT to maintain the gate-source voltage Vgs of the driving element DT.

The light emitting element EL may be implemented with an OLED including an organic compound layer formed between an anode and a cathode. The organic compound layer includes a hole injection layer (HIL), a hole transport layer (HTL), a light emitting layer (EML), an electron transport layer (ETL), and an electron injection layer, (EIL), but is not limited thereto. When a voltage is applied to the anode and cathode electrodes of the OLED, holes passed through the hole transport layer (HTL) and electrons passed through the electron transport layer (ETL) may be moved to the light emitting layer (EML) to form excitons, so that visible light is emitted from the light emitting layer (EML). The OLED used as a light emitting element may have a tandem structure in which a plurality of light emitting layers are stacked. The OLEDs with the tandem structure may improve the luminance and lifetime of pixels.

There may be a difference in electrical characteristics of the driving element DT between pixels due to a process deviation and element characteristic deviation resulting from the manufacturing process of the display panel. The difference in electrical characteristics of the driving elements DT may be increased as the driving time of the pixels elapses. An internal compensation circuit may be included in the pixel circuit of each of the sub-pixels or an external compensation circuit may be connected to compensate for a deviation in electrical characteristics of the driving element between pixels.

Touch sensors may be disposed on the display panel 100 to implement a touch screen. A touch input may be sensed using separate touch sensors or sensed through pixels. The touch sensors may be disposed on the screen of the display panel in an on-cell type or add-on type, or implemented with in-cell type touch sensors embedded in a pixel array.

In FIG. 1, the display panel driving circuit writes data of an input image into pixels of the display panel 100 under the control of a timing controller 130. The display panel driving circuit includes a data driver 110 and a gate driver 120. The display device further includes a timing controller 130 that controls operation timings of the data driver 110 and the gate driver 120 and transmits pixel data of an input image to the data driver 110, a level shifter 140 connected between the timing controller 130 and the gate driver 120, a power circuit 400, and the like.

The data driver 110 converts pixel data of an input image received as digital signals from the timing controller 130 into analog gamma compensation voltages for each frame to output data signals Vdata1 to Vdata3. As shown in a circle in FIG. 1, data signals Vdata1 to Vdata3 outputted from the data driver 110 are supplied to the corresponding data lines DL1 to DL3. The data driver 110 outputs data signals Vdata1 to Vdata3 using a digital to analog converter (hereinafter referred to as "DAC") that converts pixel data inputted as digital signals into analog gamma compensation voltages. The data driver 110 may be integrated into a source drive IC 110a shown in FIGS. 3A to 3C. The source drive IC 110a may be mounted on a flexible film 110b and connected between source PCBs 152 and 153 and the display panel 100 in a chip on film (COF) bonding process. A touch sensor driver for driving touch sensors may be embedded in each of the source drive ICs 110a.

The display panel driving circuit may further include a demultiplexer array 112 disposed between the data driver 110 and the data lines DL.

The demultiplexer array 112 sequentially connects one channel of the data driver 110 to a plurality of data lines DL and distributes data signals outputted from one channel of the data driver 110 to the data lines DL in a time division manner, so that the number of channels of the data driver 110 may be reduced. The demultiplexer array 112 may be omitted.

The gate driver 120 may be formed in a bezel area BZ in which an image is not displayed in the display panel 100, or may be distributedly disposed in the pixel array AA. The gate driver 120 outputs gate pulses GATE1, GATE2, and GATE3 in response to shift clocks received from the level shifter 140. The gate pulses GATE1, GATE2, and GATE3 are sequentially supplied to the gate lines GL1, GL2, and GL3.

The gate pulses GATE1 to GATE3 applied to the gate lines GL1 to GL3 turn on the switch element ST of the sub-pixel 101 to select pixels to which voltages of the data signals Vdata1 to Vdata3 are charged. The switch element ST of the sub-pixel 101 may be turned on in response to the gate high voltage VGH of the corresponding gate pulses GATE1 to GATE3 and turned off depending on the gate low voltage VGL. The gate pulses GATE1 to GATE3 swing between the gate high voltage VGH and the gate low voltage VGL. The gate driver 120 shifts the gate pulse using a shift register.

The timing controller 130 may multiply an input frame frequency by i and control the operation timing of the display panel drivers 110 and 120 with a frame frequency of the input frame frequency*i Hz (where "i" is a positive integer greater than 0). The input frame frequency is 60 Hz in the National Television Standards Committee (NTSC) scheme and 50 Hz in the Phase-Alternating Line (PAL) scheme.

The timing controller 130 receives pixel data of an input image and timing signals synchronized with the pixel data from a host system 200. The pixel data of the input image received by the timing controller 130 is a digital signal. The timing controller 130 transmits the pixel data to the data driver 110. The timing signals include a vertical synchronization signal Vsync, a horizontal synchronization signal Hsync, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The timing controller 130 may generate a data timing control signal for controlling the data driver 110, a gate timing control signal for controlling the gate driver 120, a MUX control signal for controlling the switching elements of the demultiplexer array 112, and the like based on the timing signals received from the host system 200. The control signal outputted from the timing controller 130 may include a clock of a digital signal voltage level.

The host system 200 may include a main board of any one of a television (TV), a set-top box, a navigation system, a personal computer (PC), a home theater, a vehicle system, a mobile system, and a wearable system. A processor of the host system may scale an image signal from a video source to match the resolution of the display panel 100 and transmit the scaled image signal to the timing controller 130 together with a timing signal. The processor of the host system may execute an application program corresponding to the touch input in response to touch data inputted from the touch sensor driver. In mobile devices and wearable devices, the data driver 110, the timing controller 130, and the level shifter may be integrated into one drive IC (not shown).

The shift clock outputted from the level shifters 140 to 142 swings between the gate high voltage VGH and the gate low voltage VGL and is supplied to the gate driver 120 through the clock lines CL1 to CLn. Clocks outputted from the level shifters 140 to 142 may be applied to at least one of the demultiplexer array 112, the gate driver 120, the data driver 110, and the touch sensor driver.

The power circuit 400 generates voltage required for driving the pixel array of the display panel 100 and the display panel driving circuit by using a DC-DC converter. The DC-DC converter may include a charge pump, a regulator, a buck converter, a boost converter, a buck-boost converter, and the like. The power circuit 400 adjusts a DC input voltage from the host system 200, so that DC voltages such as a gamma reference voltage VGMA, a gate high voltage VGH, a gate low voltage VGL, a positive polarity power supply voltage AVDD, a common voltage of pixels, and the like may be generated. The gate high voltage VGH is a voltage higher than the gate low voltage VGL. The positive polarity power supply voltage AVDD is a voltage lower than the gate high voltage VGH and higher than the gate low voltage VGL. Hereinafter, the "gate high voltage" will be referred to as a first gate voltage, the "gate low voltage" as a second gate voltage, and the "positive power supply voltage AVDD" as a third gate voltage. It should be noted that the third gate voltage AVDD is not limited to a half voltage between the first gate voltage VGH and the second gate voltage VGL, but is lower than the first gate voltage VGH and lower than the second gate voltage VGL. For example, it may be set to VGH=25 [V], VGL=−15 [V], AVDD=12 [V], but is not limited thereto. The first gate voltage VGH, the second gate voltage VGL, and the third gate voltage AVDD are supplied to the level shifter 140.

The gamma reference voltage VGMA is supplied to the data driver 110. The gamma reference voltage VGMA is divided for each gray level through a voltage dividing circuit of the data driver 110 and supplied to the DAC of the data driver 110. The power circuit 400 may generate a constant voltage commonly applied to pixels, for example, a pixel driving voltage EVDD and a pixel base voltage EVSS.

Figure 3A:
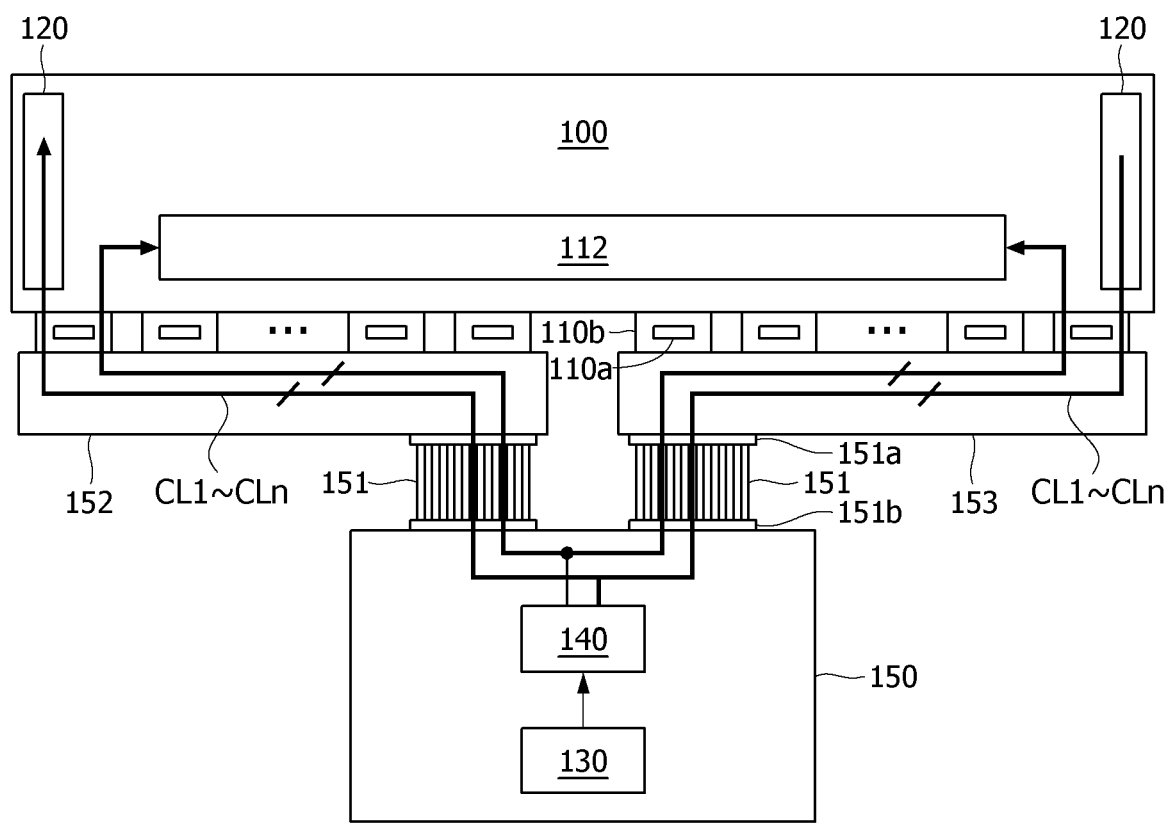
FIGS. 3A to 3C are diagrams showing examples in which a level shifter according to an aspect of the present disclosure is applied to a display device.
Figure 3B:
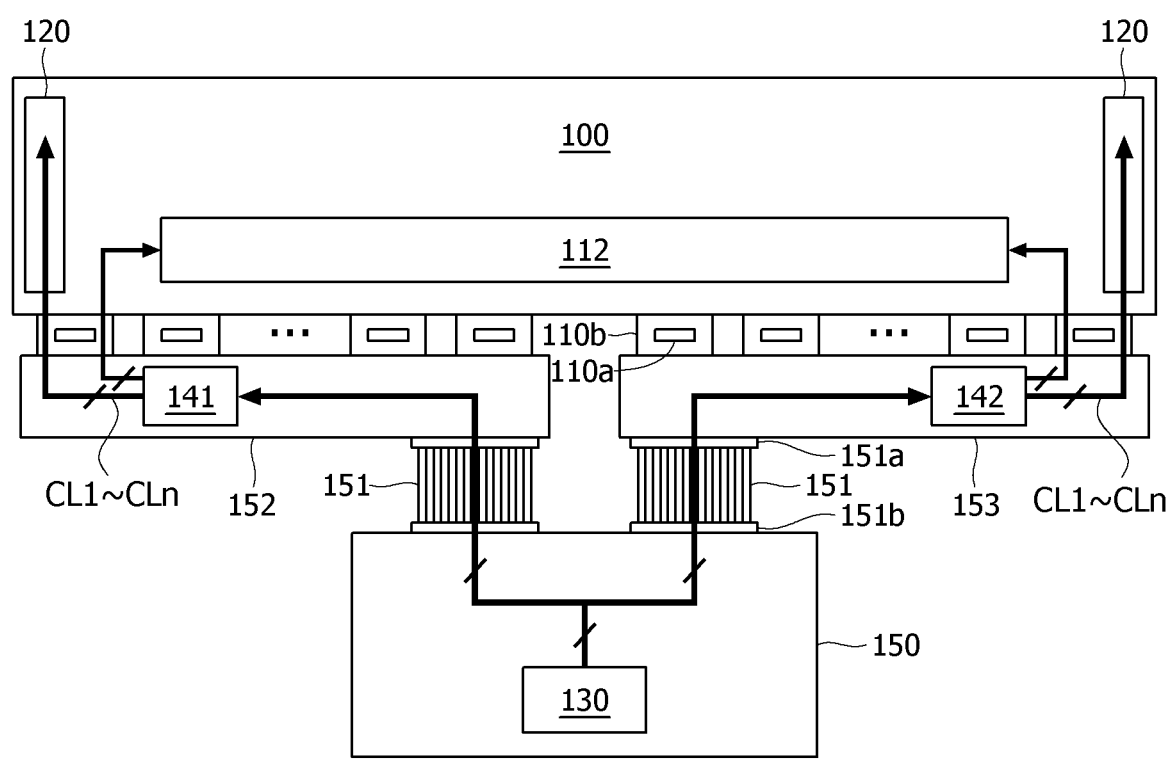
Figure 3C:
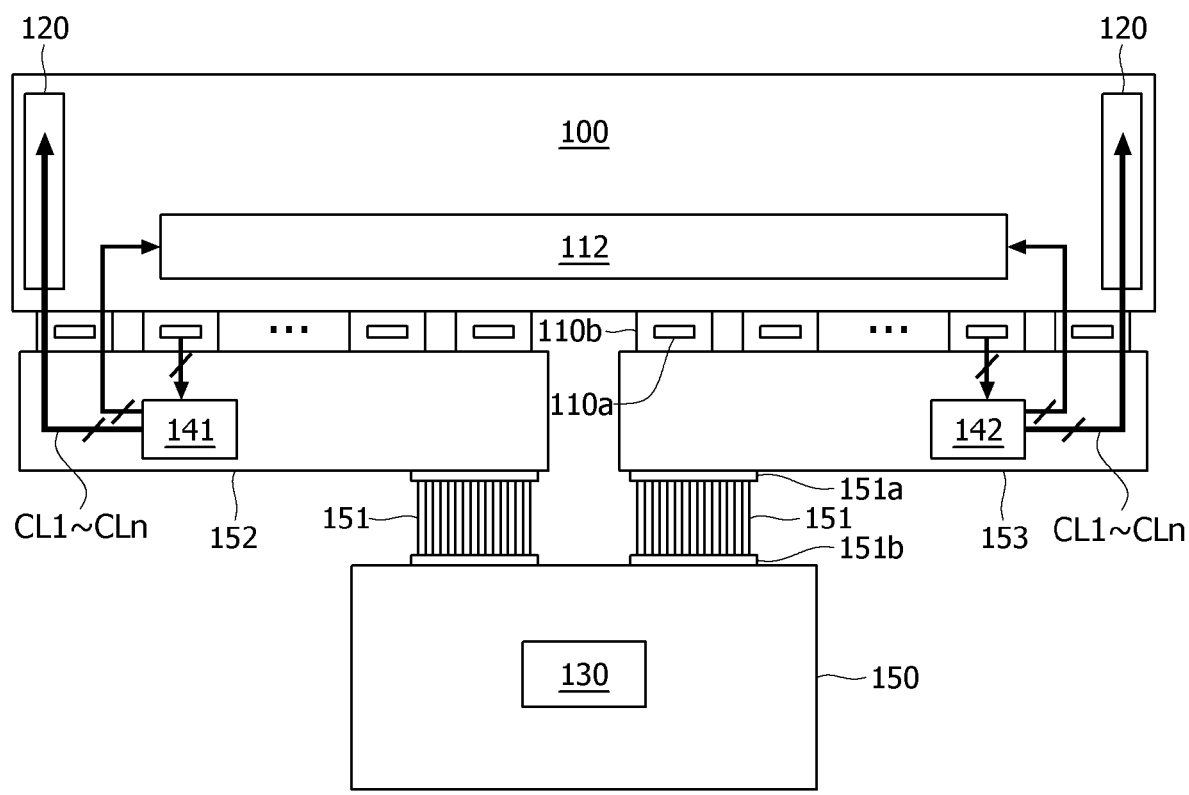

FIGS. 3A to 3C are views illustrating various aspects of a level shifter in a display device according to one aspect of the present disclosure.

Referring to FIGS. 3A to 3C, a control board 150 may be connected to the first and second source PCBs 152 and 153 through a flexible circuit board 151 such as a flexible flat cable (FFC) and a flexible printed circuit board (FPCB) and a connector 151*a* and 151*b*. The source drive ICs 110*a* are connected between the source PCBs 152 and 153 and the display panel 100.

The timing controller 130 and the level shifter 140 may be mounted on the control board 150 as shown in FIG. 3A. In this case, input terminals of the level shifter 140 are connected to the timing controller 130 through wires formed on the control board 150. Output terminals of the level shifter 140 may be connected to the gate driver 120 through wires connecting the flexible circuit board 151, the source PCB 152, the chip on film (COF) 110*b*, and the gate driver 120 on the display panel 100.

The level shifters 141 and 142 may be mounted on the source PCBs 152 and 153, respectively, as shown in FIG. 3B. The first level shifter 141 may be mounted on the first source PCB 152, and the second level shifter 142 may be mounted on the second source PCB 153. Input terminals of the level shifters 141 and 142 are connected to the timing controller 130 through wires connecting the control board 150, the flexible circuit board 151, and the source PCBs 152 and 153. Output terminals of the level shifters 141 and 142 may be connected to the gate driver 120 through wires connecting the source PCBs 152 and 153, the COF 110*b*, and the gate driver 120 on the display panel 100.

The level shifters 141 and 142 may be connected to the source drive IC 110*a* as shown in FIG. 3C. The timing controller 130 may transmit a video data packet including pixel data of an input image and a control packet including various control information to the source drive IC 110*a*. The timing controller 130 may encode the gate timing control information into the control packet and transmit it to the source drive IC 110*a*, and the source drive IC 110*a* may generate a gate timing control signal from the gate timing control information and provide it to the level shifters 141 and 142.

Figure 4:
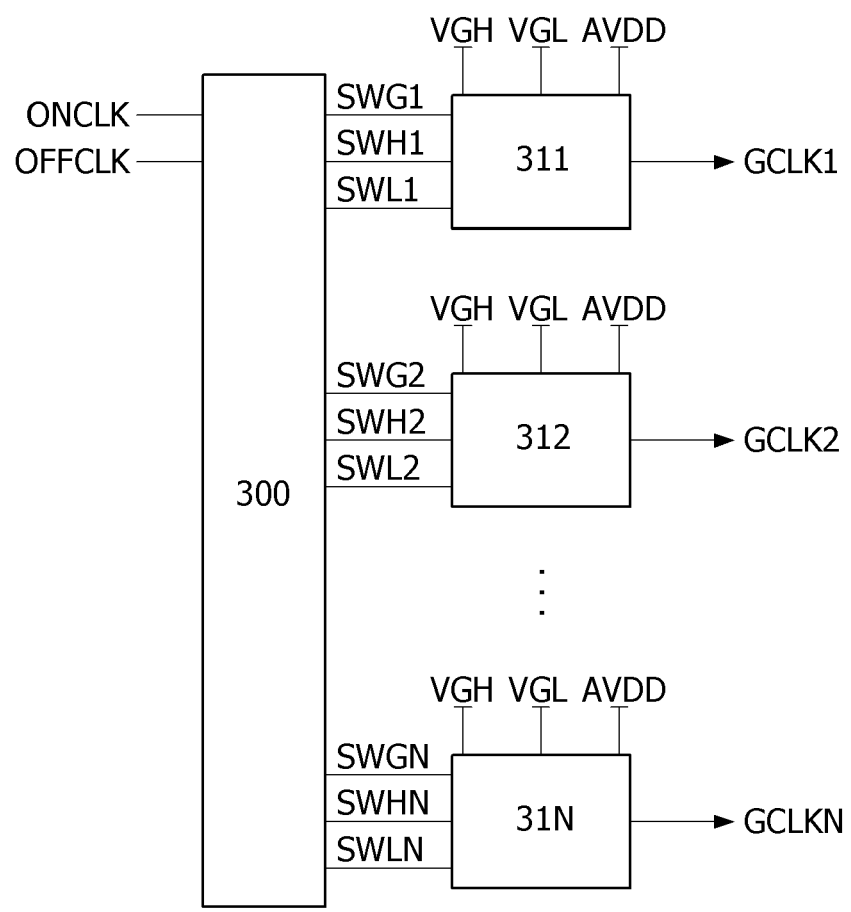
FIG. 4 is a block diagram showing a configuration of a level shifter.
Figure 5:
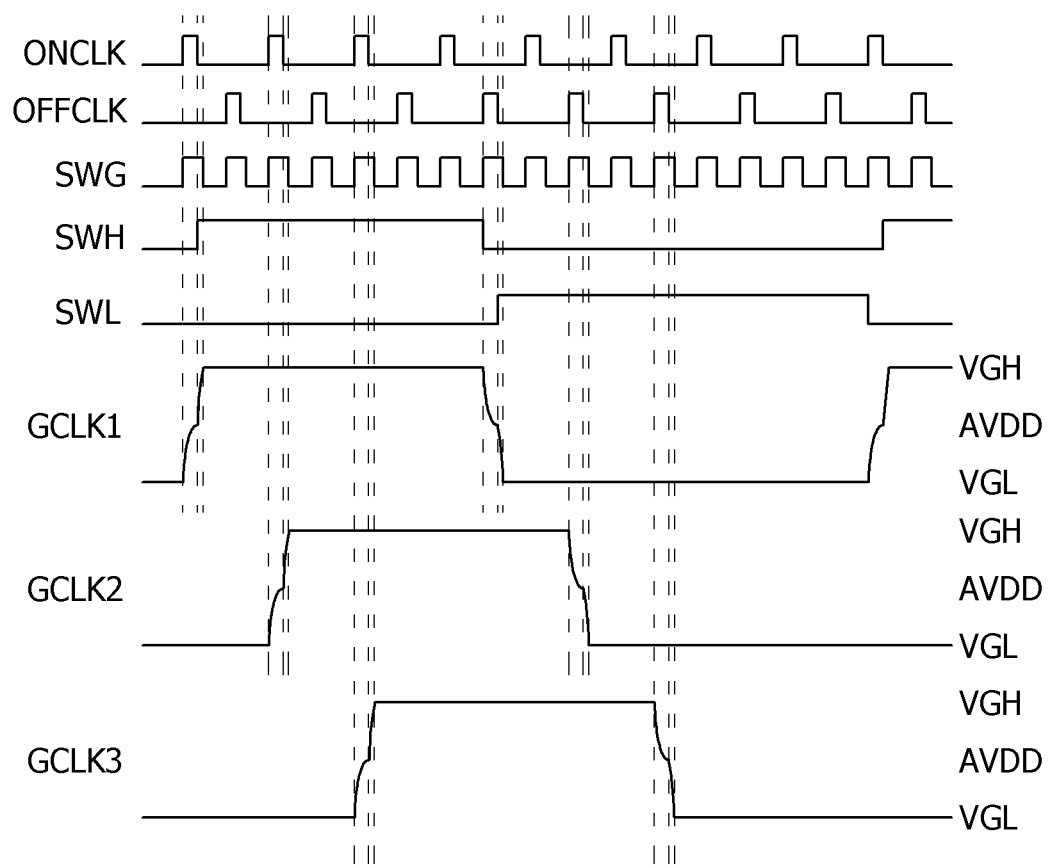
FIG. 5 is a waveform diagram showing input and output signals of a level shifter.

FIG. 4 is a block diagram showing the configuration of level shifters 140, 141, and 142. FIG. 5 is a waveform diagram showing input and output signals of the level shifters 140, 141, and 142.

Referring to FIG. 4, each of the level shifters 140, 141, and 142 may include a control part 300 and a plurality of clock output parts 311 to 31N.

When the level shifters 140, 141, and 142 include N channels (N is a positive integer greater than or equal to 2), shift clocks GCLK1 to GCLKN are sequentially outputted from first to N-th clock output parts 311 to 31N. Phases of the first to N-th shift clocks GCLK1 to GCLKN are sequentially shifted, and pulse intervals may overlap with each other. For example, as shown in FIG. 5, when the first shift clock GCLK1, the second shift clock GCLK2, and the third shift clock GLCK3 are sequentially outputted, the second shift clock GCLK2 overlaps with a portion of a pulse interval of the first shift clock GCLK1 and overlaps with a portion of a pulse interval of the third shift clock GCLK3. The shift clocks GCLK1 to GCLKN swing between the second gate voltage VGL and the first gate voltage VGH. At the rising edge of the shift clocks GCLK1 to GCLKN, the voltages of the shift clocks GCLK1 to GCLKN is increased from the second gate voltage VGL to the third gate voltage AVDD at a first slew rate and then increased to the first gate voltage VGH at a second slew rate. At falling edges of the shift clocks GCLK1 to GCLKN, the voltages of the shift clocks GCLK1 to GCLKN are lowered from the first gate voltage VGH to the third gate voltage AVDD at a third slew rate, and then lowered from the third gate voltage AVDD to the second gate voltage VGL at a fourth slew rate.

The slew rate is the amount of change in voltage per unit time. When the slew rate is high, the voltage reaches a target voltage quickly, while when the slew rate is low, the voltage reaches the target voltage slowly. The control part 300 may reduce EMI generated from the level shifters 140, 141, and 142 by lowering the slew rate on each of the rising and falling edges of the clock output from the level shifters 140, 141, and 142.

The control part 300 receives first and second input clocks ONCLK and OFFCLK from the timing controller 130. The first and second input clocks ONCLK and OFFCLK have the same frequency and a phase difference. The phase of the second input clock OFFCLK may be 180 degrees behind the phase of the first input clock ONCLK, but is not limited thereto. The first input clock ONCLK defines the rising timings of the shift clocks GCLK1 to GCLKN. The second input clock OFFCLK defines falling timings of the shift clocks GCLK1 to GCLKN.

The control part 300 outputs first and second control signals SWH and SWL synchronized with the first and second input clocks ONCLK and OFFCLK. The control part 300 sums the first and second input clocks ONCLK and OFFCLK and outputs a third control signal SWG having a multiplied frequency. The phases of the first to third control signals SWH, SWL, and SWG separated for each channel are shifted in units of channels. The first to third control signals SWH, SWL, and SWG are separated for each channel and inputted to the clock output parts 311 to 31N.

To reduce EMI of the shift clocks GCLK1 to GCLKN outputted to the gate driver 120, the control part 300 allows some of the pulses of the third control signal SWG to overlap with the pulses of the first and second control signals SWH and SWL. A portion of a pulse interval (or pulse width) of the third control signal SWG overlapping with the first and second control signals SWH and SWL may include a falling edge in the pulse of the third control signal SWG. The rising edge in the pulse of the third control signal SWG may not be overlapping with the first and second control signals SWH and SWL.

The clock output parts 311 to 31N receive the first to third control signals SWH, SWL, and SWG separated for each channel. For example, the first clock output part 311 receives control signals SWH1, SWL1, and SWG1 of the first channel. The second clock output part 312 receives control signals SWH2, SWL2, and SWG2 of the second channel which are later in phase than the control signals SWH1, SWL1, and SWG1 of the first channel. The Nth clock output part 31N receives the control signals SWHN, SWLN, and SWGN of the N-th channel which are later in phase than the control signals of a N−1-th channel.

Each of the clock output parts 311 to 31N outputs the first gate voltage VGH during a pulse interval of the first control signal SWH and the second gate voltage VGL during a pulse interval of the second control signal SWL. Each of the clock output parts 311 to 31N may lower the slew rates of the shift clocks GCLK1 to GCLKN in the time in which the pulse of the first control signal SWH overlaps with the pulse of the third control signal SWG, thereby reducing EMI. Each of the clock output parts 311 to 31N may lower the slew rates of the shift clocks GCLK1 to GCLKN in an interval in which the pulse of the second control signal SWL overlaps with the pulse of the third control signal SWG, thereby reducing EMI. Therefore, the slew rate may be lowered at the time when pulses overlap with each other.

Figure 6:
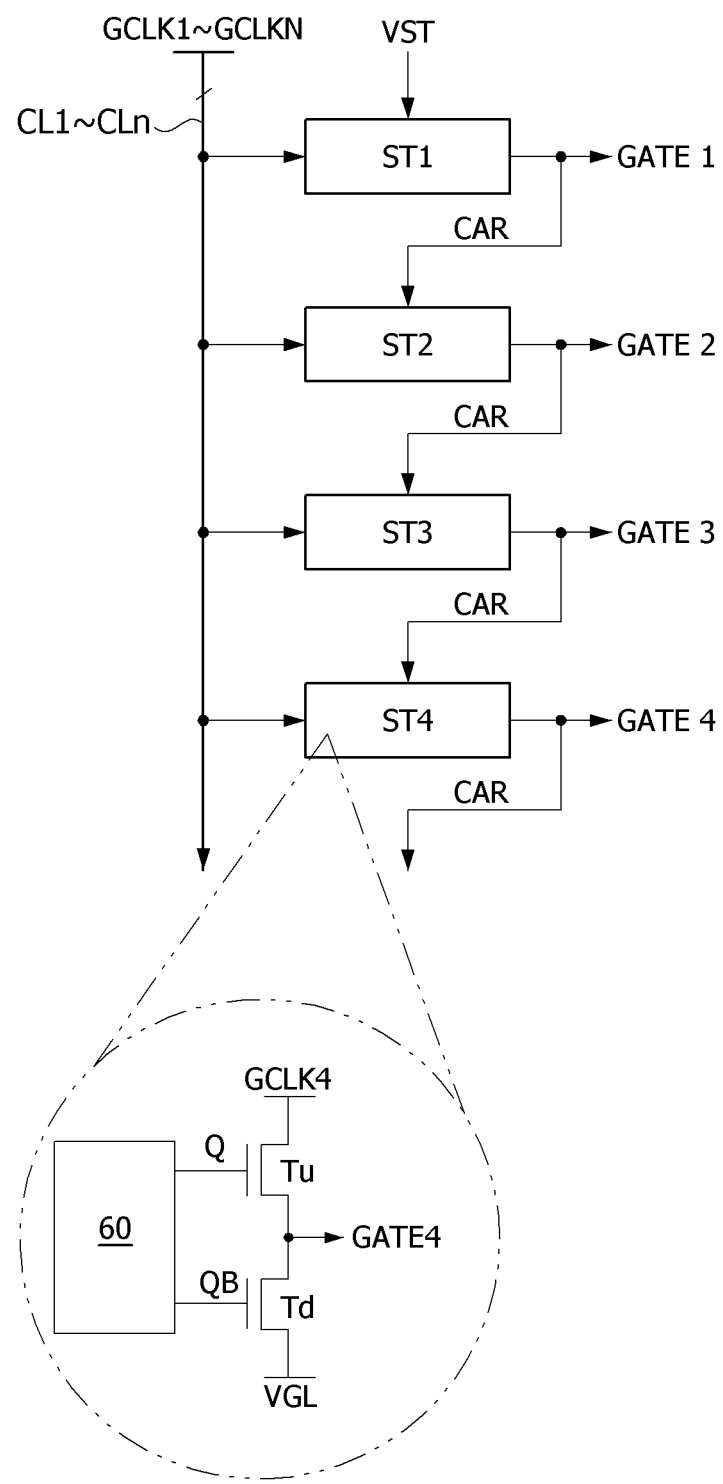
FIG. 6 is a circuit diagram schematically showing a shift register of a gate driver.

FIG. 6 is a circuit diagram schematically showing a shift register of a gate driver 120.

Referring to FIG. 6, the shift register of the gate driver 120 includes signal transfer parts ST1 to ST4 connected in cascade. The signal transfer parts ST1 to ST4 receive a start pulse VST received from the outside or a carry signal CAR from a previous signal transfer part, and receive shift clocks GCLK1 to GCLKN. The start pulse VST may be generated independently of a first pulse of the first shift clock GCLK1 inputted to the first signal transfer part ST1 or the shift clocks GCLK1 to GCLKN.

A driver 60 of each of the signal transfer parts ST1 to ST4 charges and discharges a first control node Q and a second control node QB. An output buffer of each of the signal transfer parts ST1 to ST4 includes a pull-up transistor Tu and a pull-down transistor Td. The pull-up transistor Tu is turned on when the shift clocks GCLK1 to GCLKN are inputted in a state where the first control node Q is charged, so that the voltages of the gate signals GATE1 to GATE4 are increased by charging the output node with the first gate voltage VGH. The pull-down transistor Td is turned on when the second control node QB is charged, so that the voltages of the gate signals GATE1 to GATE4 may be lowered by discharging the output node to the second gate voltage VGL. Therefore, the shift register of the gate driver 120 sequentially shifts the pulses of the gate signals GATE1 to GATE4 in response to the shift clocks GCLK1 to GCLKN and outputs them to the gate lines.

Figure 7:
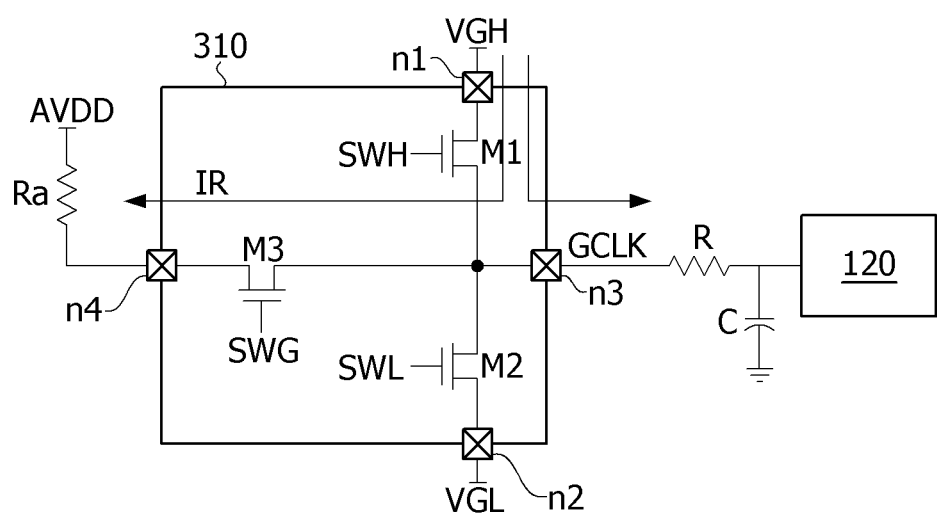
FIG. 7 is a circuit diagram showing in detail a clock output part shown in FIG. 4.

FIG. 7 is a circuit diagram showing in detail clock output parts of the level shifters 140, 141, and 142.

Referring to FIG. 7, a clock output part 310 includes a first transistor M1 connected between a first power input terminal n1 and an output terminal n3, a second transistor M2 connected between a second power input terminal n2 and the output terminal n3, and a third transistor M3 connected between a third power input terminal n4 and the output terminal n3. The first gate voltage VGH is supplied to the first power input terminal n1. The second gate voltage VGL is supplied to the second power input terminal n2. The third gate voltage AVDD is supplied to the third power input terminal n4.

The shift clock GCLK outputted from the clock output part 310 is supplied to the gate driver 120 through the output terminal n3. A low pass filter (LPF) may be connected to a clock line between the clock output part 310 and the gate driver 120, but is not limited thereto. The low pass filter (LPF) may include a resistor R connected in series with the clock line and a capacitor C connected between the clock line and the ground voltage source GND.

The first transistor M1 is turned on in response to a voltage of on-intervals of the first control signal SWH to electrically connect the first power input terminal n1 to the output terminal n3, and is turned off in response to an off-interval voltage of the first control signal SWH. When the first transistor M1 is turned on, the first gate voltage VGH is supplied to the output terminal n3. The first transistor M1 includes a first electrode connected to the first power input terminal n1, a gate electrode to which the first control signal SWH is applied and a second electrode connected to the output terminal n3.

The second transistor M2 is turned on in response to a voltage of on-intervals of the second control signal SWL to electrically connect the second power input terminal n2 to the output terminal n3, and is turned off in response to an off-interval voltage of the second control signal SWL. When the second transistor M2 is turned on, the second gate voltage VGL is supplied to the output terminal n3. The second transistor M2 includes a first electrode connected to the second power input terminal n2, a gate electrode to which the second control signal SWL is applied and a second electrode connected to the output terminal n3.

The third transistor M3 is turned on in response to a voltage of on-intervals of the third control signal SWG to electrically connect the third power input terminal n4 to the output terminal n3, and is turned off in response to the off-interval voltage of the third control signal SWG. When the third transistor M3 is turned on, the third gate voltage AVDD is supplied to the output terminal n3. The third transistor M3 includes a first electrode connected to the third power input terminal n4, a gate electrode to which the third control signal SWG is applied and a second electrode connected to the output terminal n3.

Figure 8:
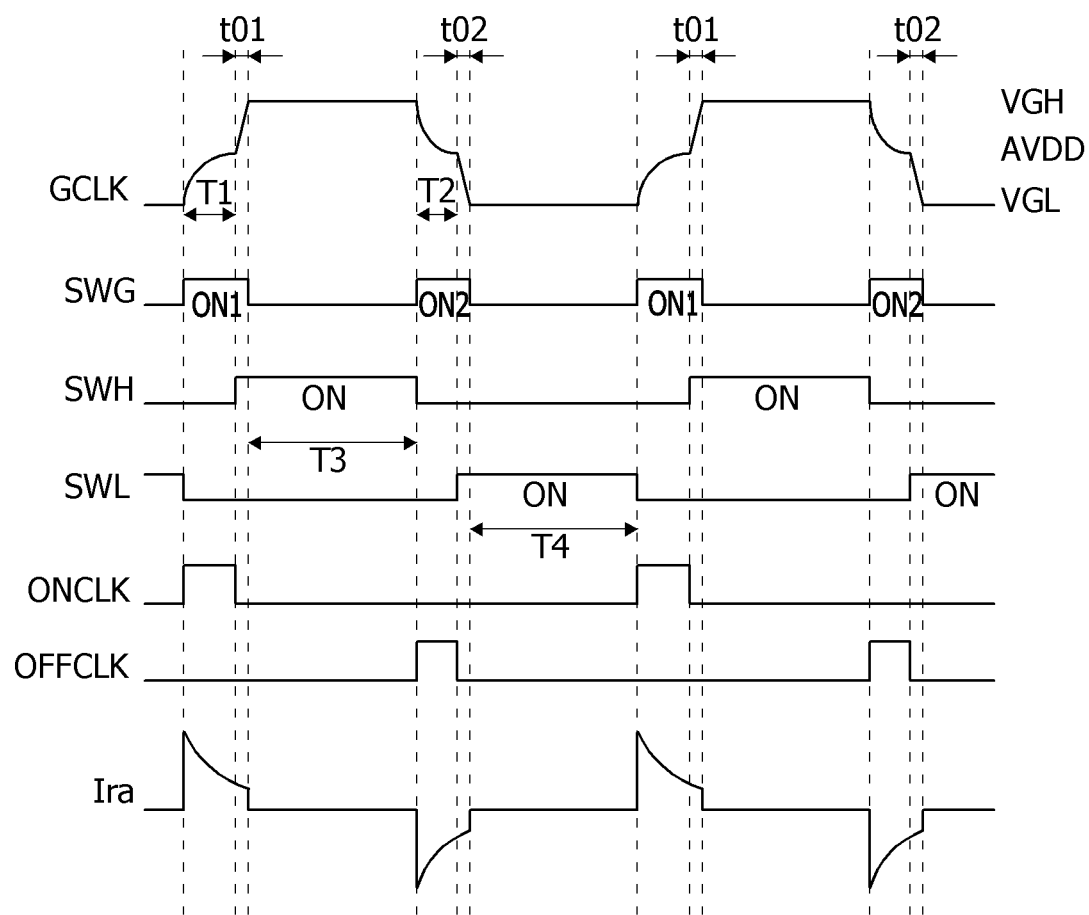
FIG. 8 is a waveform diagram showing a method of driving a level shifter according to one aspect of the present disclosure.

The first and third transistors M1 and M3 may be implemented with an N-channel MOSFET (NMOS) and the second transistor M2 may be implemented with a P-channel MOSFET (PMOS). In this case, in FIG. 8, the second control signal SWL is a phase-inverted signal and may be applied to the gate electrode of the second transistor M2. In FIG. 8, during the on-intervals ON of the control signals SWH, SWL, and SWG, the corresponding transistors M1, M2, and M3 are turned on.

FIG. 8 is a waveform diagram showing a method of driving a level shifter according to one aspect of the present disclosure.

Referring to FIG. 8, each of the pulse intervals ON1 and ON2 of the third control signal SWG are greater than each pulse interval of the first and second input clocks ONCLK and OFFCLK, respectively.

The first on-interval ON1 of the third control signal SWG includes a first non-overlapping interval T1 and a first overlapping interval t01. The first on-interval ON1 of the third control signal SWG may be an odd-numbered pulse interval of the third control signal SWG, but is not limited thereto.

The first non-overlapping interval T1 is not overlapping with the on-intervals ON of the first and second control signals SWH and SWL. The first overlapping interval t01 overlaps with a portion of an interval including a rising edge among the on-intervals ON of the first control signal SWH. The first overlapping interval t01 is not overlapping with the input clocks ONCLK and OFFCLK. During the first overlapping interval t01, a current Ira flows a power supply wiring to which the third gate voltage AVDD is applied and the pull-up resistor Ra and the pulses of the input clocks ONCLK and OFFCLK are not inputted to the level shifters 140, 141, and 142.

During the first non-overlapping interval T1, the third transistor M3 is in an on state, while the first and second transistors M1 and M2 are in an off state. During the first non-overlapping interval T1, the voltage of the shift clock GCLK is increased from the second gate voltage VGL to the third gate voltage AVDD at a first slew rate.

During the first overlapping interval t01, the first and third transistors M1 and M3 are in an on state, while the second transistor M2 is in an off state. During the first overlapping interval t01, a current flows from the first power input terminal n1 to the output terminal n3 and simultaneously a current Ira flows the pull-up resistor Ra connected to a wire to which the third gate voltage ADD is applied through the third power input terminal n4. In this case, the pulses of the input clocks ONCLK and OFFCLK are not inputted to the level shifters 140, 141, and 142. During the first overlapping interval t01, the voltage of the shift clock GCLK is increased from the third gate voltage AVDD to the first gate voltage VGH at the second slew rate. The second slew rate may be higher than the first slew rate, but is not limited thereto. The second slew rate may be controlled depending on the first overlapping interval t01. Since the second slew rate is lowered by the time of the first overlapping interval t01, EMI generated when the voltage of the shift clock GCLK is increased to the first gate voltage VGH may be reduced.

The second on-interval ON2 of the third control signal SWG includes a second non-overlapping interval T2 and a second overlapping interval t02. The second on-interval ON2 of the third control signal SWG may be an even-numbered pulse interval of the third control signal SWG, but is not limited thereto.

The second non-overlapping interval T2 does not overlap with the on-intervals ON of the first and second control signals SWH and SWL. The second overlapping interval t02 overlaps with a portion of an interval including a rising edge among the on-intervals ON of the second control signal SWL. The second overlapping interval t02 is not overlapping with the input clocks ONCLK and OFFCLK. During the second overlapping interval t02, the current Ira flows the power supply wiring to which the third gate voltage AVDD is applied and the pull-up resistor Ra and the pulses of the input clocks ONCLK and OFFCLK are not inputted to the level shifter 140, 141 and 142.

During the second non-overlapping interval T2, the third transistor M3 is in an on state, while the first and second transistors M1 and M2 are in an off state. During the second non-overlapping interval T2, the voltage of the shift clock GCLK is decreased from the first gate voltage VGH to the third gate voltage AVDD at a third slew rate.

During the second overlapping interval t02, the second and third transistors M2 and M3 are in an on state, while the first transistor M1 is in an off state. During the second overlapping interval t02, a current flows from the output terminal n3 to the second power input terminal n2 and the current Ira flows the pull-up resistor Ra connected to a wire to which the third gate voltage ADD is applied through the third power input terminal n4. In this case, the pulses of the input clocks ONCLK and OFFCLK are not inputted to the level shifters 140, 141, and 142. During the second overlapping interval t02, the voltage of the shift clock GCLK is lowered from the third gate voltage AVDD to the second gate voltage VGL at a fourth slew rate. The fourth slew rate may be higher than the third slew rate, but is not limited thereto. The fourth slew rate may be controlled depending on the second overlapping interval t02. Since the fourth slew rate is lowered by the time of the second overlapping interval t02, EMI generated when the voltage of the shift clock GCLK is lowered to the second gate voltage VGL may be reduced.

The on-interval ON of the first control signal SWH includes a first overlapping interval t01 and a third non-overlapping interval T3. During the first overlapping interval t01, the first and third transistors M1 and M3 are simultaneously turned on. The third non-overlapping interval T3 is not overlapping with the on-intervals ON, ON1, and ON2 of the second and third control signals SWL and SWG. During the third non-overlapping interval T3, the first transistor M1 is in an on state, while the second and third transistors M2 and M3 are in an off state. Therefore, the voltage of the shift clock GCLK maintains the first gate voltage VGH during the third non-overlapping interval T3.

The on-interval ON of the second control signal SWL includes a second overlapping interval t02 and a fourth non-overlapping interval T4. During the second overlapping interval t02, the second and third transistors M2 and M3 are simultaneously turned on. The fourth non-overlapping interval T4 is not overlapping with the on-intervals ON, ON1, and ON2 of the first and third control signals SWH and SWG. During the fourth non-overlapping interval T4, the second transistor M2 is in an on state, while the first and third transistors M1 and M3 are in an off state. Therefore, the voltage of the shift clock GCLK maintains the second gate voltage VGL during the fourth non-overlapping interval T4.

An off-interval of the first control signal SWH overlaps with the second non-overlapping interval T2, the second overlapping interval t02, the fourth non-overlapping interval T4, and the first non-overlapping interval T1. The off-interval of the second control signal SWL overlaps with the first non-overlapping interval T1, the first overlapping interval t01, the third non-overlapping interval T3, and the second non-overlapping interval T2. Therefore, the first transistor M1 and the second transistor M2 are not turned on simultaneously but are turned on alternately.

Figure 9:
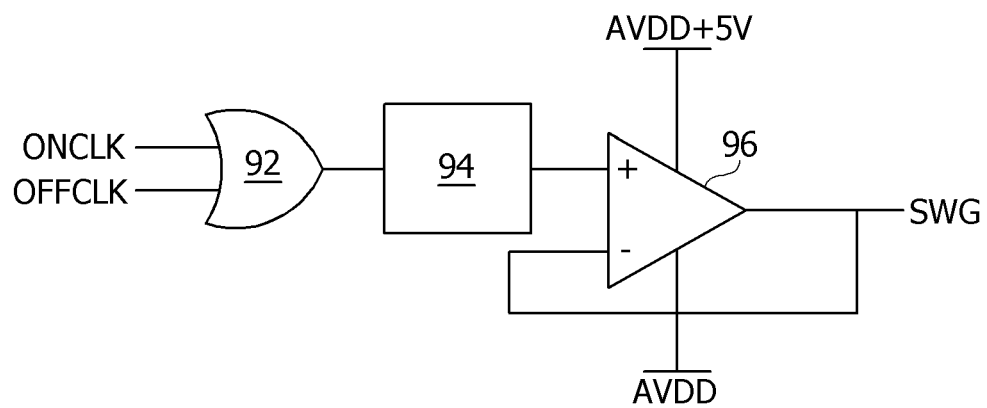
FIG. 9 is a circuit diagram showing a third control signal generation circuit according to an aspect of the present disclosure.
Figure 10:
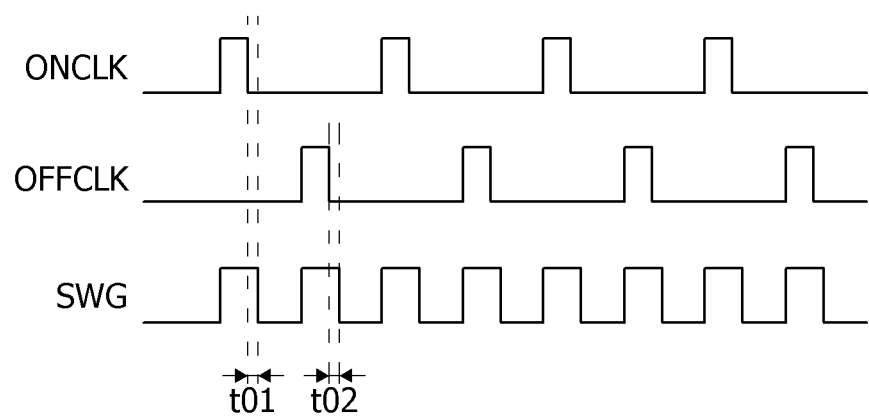
FIG. 10 is a waveform diagram showing input and output signals of the third control signal generation circuit shown in FIG. 9.

FIG. 9 is a circuit diagram showing a clock generation circuit for generating the third control signal shown in FIG. 8. FIG. 10 is a waveform diagram showing input/output signals of the third control signal generation circuit shown in FIG. 9.

Referring to FIGS. 9 and 10, the clock generation circuit includes an input circuit 92, a clock modulation circuit 94, and an output buffer 96.

The input circuit 92 may include an OR gate in which the first and second input clocks ONCLK and OFFCLK are received and a logical sum thereof is outputted. The clock modulation circuit 94 receives the output signal of the input circuit 92. The clock modulation circuit 94 modulates a pulse width of the clock inputted from the input circuit 92 to be longer by the overlapping intervals t01 and t02 as shown in FIG. 8, and outputs the modulated pulse width. The output buffer 96 receives the output signal of the clock modulation circuit 94 and outputs the third control signal SWG swinging between the third gate voltage AVDD and a boosted third gate voltage AVDD+5V. The output buffer 96 may include a voltage follower.

The level shifters 140, 141, and 142 may generate the boosted third gate voltage AVDD+5V using a power supply circuit that boosts the third gate voltage AVDD, for example, using a charge pump. The boosted third gate voltage AVDD+5V is set to a voltage higher than or equal to a threshold voltage of the fifth transistor M4. The on-interval voltage of the third control signal SWG may be the boosted third gate voltage AVDD+5V.

Figure 11:
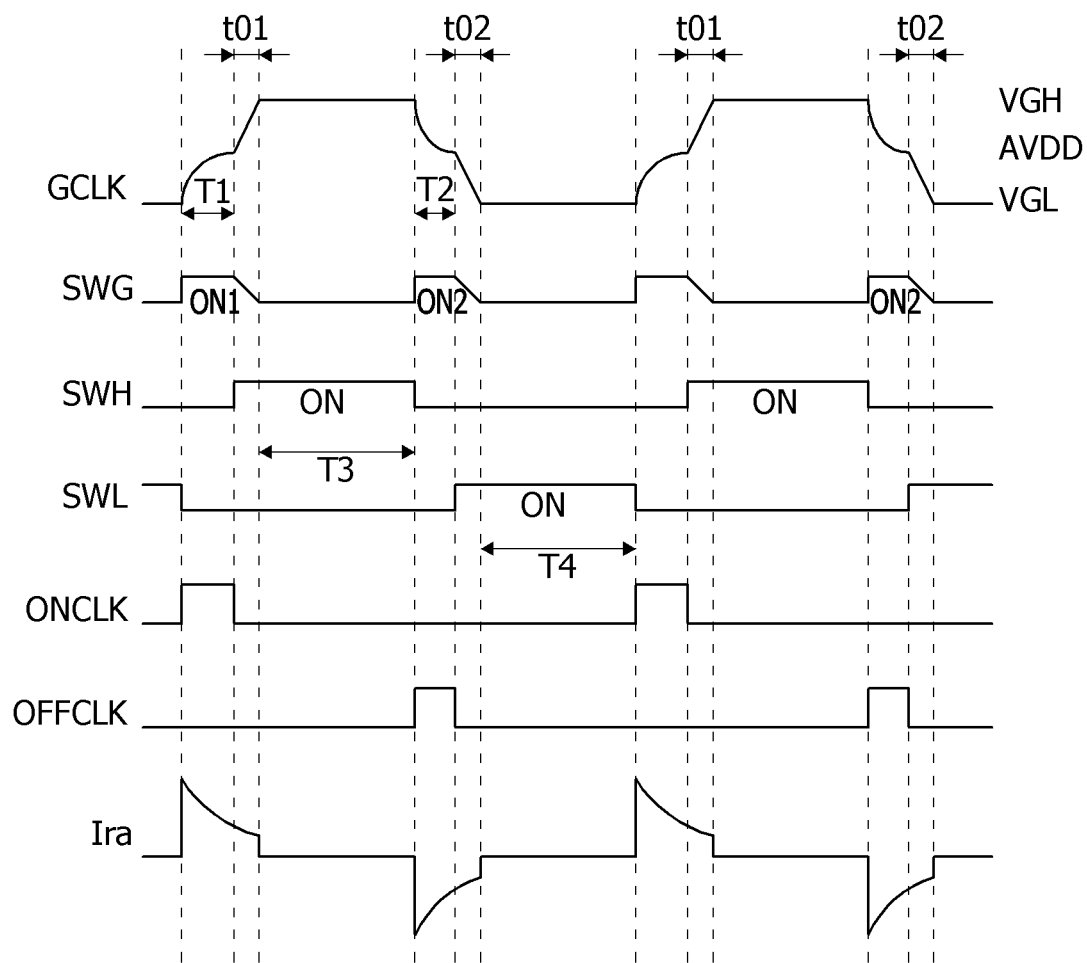
FIG. 11 is a waveform diagram showing a method of driving a level shifter according to another aspect of the present disclosure.

FIG. 11 is a waveform diagram showing a method of driving a level shifter according to another aspect of the present disclosure. In FIG. 11, the same reference numerals are assigned to components substantially the same as those of the above-described aspect in conjunction with FIG. 8, and detailed descriptions thereof will be omitted.

Referring to FIG. 11, the first on-interval ON1 of the third control signal SWG includes a first non-overlapping interval T1 and a first overlapping interval t01. The first overlapping interval t01 overlaps with a portion of an interval including a rising edge among the on-intervals ON of the first control signal SWH. The first overlapping interval t01 is not overlapping with the input clocks ONCLK and OFFCLK. During the first overlapping interval t01, the voltage of the third control signal SWG is gradually decreased. A portion of the first overlapping interval t01 may be overlapping with an interval in which the voltage of the shift clock GCLK is maintained at the first gate voltage VGH.

During the first overlapping interval t01, a current flows from the first power input terminal n1 toward the output terminal n3 and simultaneously flows from the first power input terminal n1 toward the third power input terminal n4. Therefore, during the first overlapping interval t01, the current Ira flows the power supply wiring to which the third gate voltage AVDD is applied and the pull-up resistor Ra. In this case, the pulses of the input clocks ONCLK and OFFCLK are not inputted to the level shifters 140, 141, and 142.

The second on-interval ON2 of the third control signal SWG includes a second non-overlapping interval T2 and a second overlapping interval t02. The second overlapping interval t02 overlaps with a portion of an interval including a rising edge among the on-intervals ON of the second control signal SWL. The second overlapping interval t02 is not overlapping with the input clocks ONCLK and OFFCLK. During the second overlapping interval t02, the voltage of the third control signal SWG is gradually decreased. A portion of the second overlapping interval t02 may be overlapping an interval in which the voltage of the shift clock GCLK is maintained at the first gate voltage VGH.

During the second overlapping interval t02, a current flows from the output terminal n3 toward the second power input terminal n2 and simultaneously a current flows from the third power input terminal n4 toward the second power input terminal n2. Therefore, during the second overlapping interval t02, the current Ira flows the power supply wiring to which the third gate voltage AVDD is applied and the pull-up resistor Ra. In this case, the pulses of the input clocks ONCLK and OFFCLK are not inputted to the level shifters 140, 141, and 142.

Figure 12:
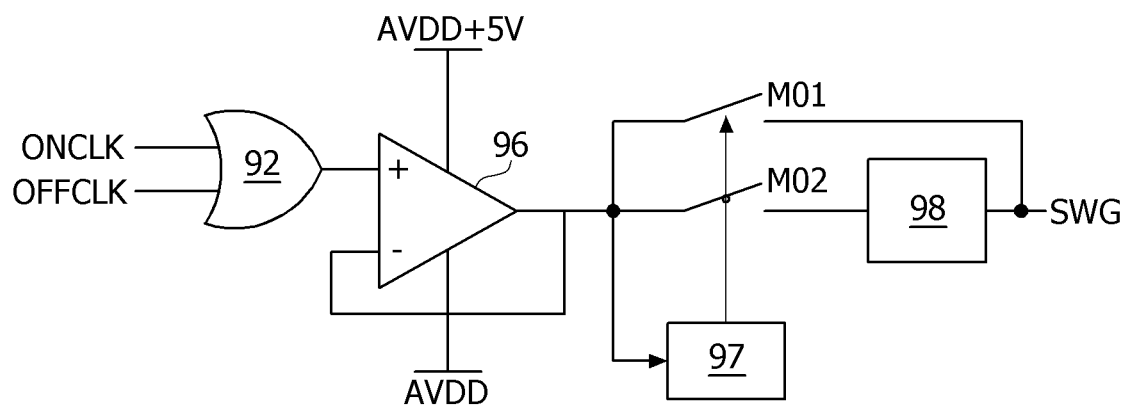
FIG. 12 is a circuit diagram showing a third control signal generation circuit according to one aspect of the present disclosure.
Figure 13:
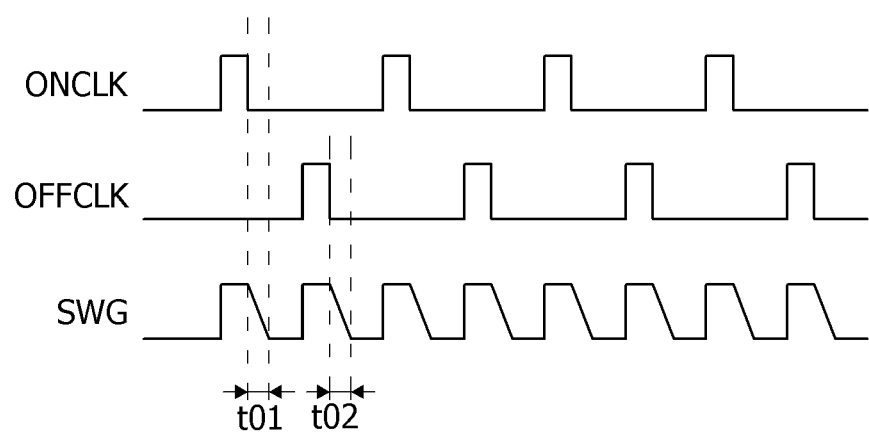
FIG. 13 is a waveform diagram showing input and output signals of the third control signal generation circuit shown in FIG. 12.

FIG. 12 is a circuit diagram showing a clock generation circuit for generating the third control signal shown in FIG. 11. FIG. 13 is a waveform diagram showing input/output signals of the third control signal generation circuit shown in FIG. 12.

Referring to FIGS. 12 and 13, the clock generation circuit includes an input circuit 92, an output buffer 96, an edge detection circuit 97, first and second switch elements M01 and M02, and a delay circuit 98.

The input circuit 92 may include an OR gate in which the first and second input clocks ONCLK and OFFCLK are received and a logical sum thereof is outputted. The output buffer 96 receives the output signal of the input circuit 92 and outputs the third control signal SWG swinging between the third gate voltage AVDD and the boosted third gate voltage AVDD+5V.

The first switch element M01 may be connected between an output terminal of the output buffer 96 and an output terminal of the delay circuit 98 to be turned on/off under the control of the edge detection circuit 97. The second switch element M02 may be connected between the output terminal of the output buffer 96 and an input terminal of the delay circuit 98 to be turned on/off under the control of the edge detection circuit 97. Each of the first and second switch elements M01 and M02 may be implemented with transistors, respectively.

The edge detection circuit 97 detects a rising edge and a falling edge from the pulses of the third control signal SWG inputted from the output buffer 96. When the rising edge is detected in the third control signal SWG, the edge detection circuit 97 may apply a gate signal of a gate-on voltage to the gate electrode of the first switch element M01 to turn on the first switch element M01. Therefore, when a rising edge is detected in the third control signal SWG, the third control signal SWG is applied to the gate electrode of the third switch element M3 without delay.

When a falling edge is detected in the third control signal SWG, the edge detection circuit 97 may apply an inverted gate signal of the gate-on voltage to the gate electrode of the second switch element M02 to turn on the second switch element M02. Therefore, when a falling edge is detected in the third control signal SWG, the falling edge voltage is delayed through the delay circuit 98 and the third control signal SWG is applied to the gate electrode of the third switch element M3.

The delay circuit 98 delays the falling edge of the third control signal SWG inputted through the second switch element M02. The delay circuit 98 may be implemented with an RC delay circuit, but is not limited thereto.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A level shifter comprising:
  a first power input terminal to which a first gate voltage is applied;
  a second power input terminal to which a second gate voltage lower than the first gate voltage is applied;
  a third power input terminal to which a third gate voltage lower than the first gate voltage and higher than the second gate voltage is applied;
  an output terminal through which a shift clock is outputted;
  a first switch element configured to electrically connect the first power input terminal to the output terminal in response to a voltage of on-intervals of a first control signal;
  a second switch element configured to electrically connect the second power input terminal to the output terminal in response to a voltage of on-intervals of a second control signal; and
  a third switch element configured to electrically connect the third power input terminal to the output terminal in response to a voltage of on-intervals of a third control signal, wherein a portion of a first on-interval of the third control signal overlaps with a portion of the on-intervals of the first control signal; and a portion of a second on-interval of the third control signal overlaps with a portion of the on-intervals of the second control signal, wherein the first on-interval of the third control signal includes:

a first non-overlapping interval not overlapping with the on-interval of the first control signal and the on-interval of the second control signal; and a first overlapping interval overlapping with a portion of an interval including a rising edge of a pulse among the on-intervals of the first control signal, and wherein the second on-interval of the third control signal includes:

a second non-overlapping interval not overlapping with the on-interval of the first control signal and the on-interval of the second control signal; and a second overlapping interval overlapping with a portion of an interval including a rising edge of a pulse among the on-intervals of the second control signal.

2. The level shifter of claim 1, wherein during the first overlapping interval, a current flows between the first power input terminal and the output terminal and simultaneously a current flows between the third power input terminal and the output terminal, and wherein during the second overlapping interval, a current flows between the second power input terminal and the output terminal and simultaneously a current flows between the third power input terminal and the second power input terminal.

3. The level shifter of claim 1, further comprising a control part configured to receive a first input clock and a second input clock which has the same frequency as the first input clock and a phase difference with respect to the first input clock, and configured to output the first control signal, the second control signal, and the third control signal.

4. The level shifter of claim 3, wherein the first overlapping interval and the second overlapping interval are not overlapping with the first input clock and the second input clock, respectively.

5. The level shifter of claim 3, wherein during the first overlapping interval and the second overlapping interval, a current flows in a power supply wire to which the third gate voltage is applied, and pulses of the first input clock and the second input clock are not inputted in the level shifter.

6. The level shifter of claim 1, wherein the first non-overlapping interval and the second non-overlapping interval are not overlapping with the on-interval of the first control signal and the on-interval of the second control signal, respectively.

7. The level shifter of claim 1, wherein the on-interval of the first control signal includes:

the first overlapping interval; and a third non-overlapping interval not overlapping with the on-interval of the second control signal and the first and second on-intervals of the third control signal, and wherein the on-interval of the second control signal includes:

the second overlapping interval; and a fourth non-overlapping interval not overlapping with the on-interval of the first control signal and the first and second on-intervals of the third control signal.

8. A display device comprising:

a display panel on which a plurality of data lines, a plurality of gate lines, and a plurality of pixels are disposed;

a data driver configured to output data signals applied to the data lines;

a gate driver configured to receive a shift clock and supply gate pulses to the gate lines; and a level shifter configured to receive a first input clock, a second input clock which has the same frequency as the first input clock and a different phase with respect to the first input clock, a first gate voltage, a second gate voltage lower than the first gate voltage, and a third gate voltage having a voltage level between the first gate voltage and the second gate voltage, and configured to output the shift clock, wherein the level shifter includes:

a first power input terminal to which a first gate voltage is applied;

a second power input terminal to which a second gate voltage is applied;

a third power input terminal to which a third gate voltage is applied;

an output terminal through which the shift clock is outputted;

a controller configured to receive the first input clock and the second input clock and output a first control signal, a second control signal, and a third control signal;

a first switch element configured to electrically connect the first power input terminal to the output terminal in response to a voltage of on-intervals of the first control signal;

a second switch element configured to electrically connect the second power input terminal to the output terminal in response to a voltage of on-intervals of the second control signal; and a third switch element configured to electrically connect the third power input terminal to the output terminal in response to a voltage of on-intervals of the third control signal, and wherein a portion of a first on-interval of the third control signal overlaps with a portion of the on-intervals of the first control signal; and a portion of a second on-interval of the third control signal overlaps with a portion of the on-intervals of the second control signal, wherein the first on-interval of the third control signal includes:

a first non-overlapping interval not overlapping with the on-interval of the first control signal and the on-interval of the second control signal; and a first overlapping interval overlapping with a portion of an interval including a rising edge of a pulse among the on-intervals of the first control signal, and wherein the second on-interval of the third control signal includes:

a second non-overlapping interval not overlapping with the on-interval of the first control signal and the on-interval of the second control signal; and a second overlapping interval overlapping with a portion of an interval including a rising edge of a pulse among the on-intervals of the second control signal.

9. The display device of claim 8, wherein during the first overlapping interval,
  a current flows between the first power input terminal and the output terminal and simultaneously a current flows between the third power input terminal and the output terminal, and wherein during the second overlapping interval,
  a current flows between the second power input terminal and the output terminal and simultaneously a current flows between the third power input terminal and the second power input terminal.

\* \* \* \* \*